(12) United States Patent
Mitamura et al.

(10) Patent No.: US 9,382,406 B2
(45) Date of Patent: Jul. 5, 2016

(54) VINYL CHLORIDE RESIN COMPOSITION FOR TRANSPARENT PRODUCTS

(71) Applicant: ADEKA CORPORATION, Tokyo (JP)

(72) Inventors: Ryusuke Mitamura, Saitama (JP); Tadashi Sengoku, Saitama (JP); Kazumasa Tanaka, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 14/774,252

(22) PCT Filed: Feb. 27, 2014

(86) PCT No.: PCT/JP2014/001056
§ 371 (c)(1),
(2) Date: Sep. 10, 2015

(87) PCT Pub. No.: WO2014/141608
PCT Pub. Date: Sep. 18, 2014

(65) Prior Publication Data
US 2016/0017126 A1    Jan. 21, 2016

(30) Foreign Application Priority Data
Mar. 12, 2013   (JP) .................................. 2013-049246

(51) Int. Cl.
*C08C 19/02*   (2006.01)
*C08F 14/06*   (2006.01)
*C08K 5/524*   (2006.01)
*C08K 3/26*    (2006.01)
*C08K 5/098*   (2006.01)
*C08K 5/00*    (2006.01)

(52) U.S. Cl.
CPC . *C08K 5/524* (2013.01); *C08K 3/26* (2013.01); *C08K 5/005* (2013.01); *C08K 5/098* (2013.01); *C08K 2003/267* (2013.01)

(58) Field of Classification Search
CPC .......... C08K 5/524; C08K 3/26; C08K 5/098; C08K 5/005; C08K 2003/267
USPC ........................................ 524/147; 526/344
See application file for complete search history.

(56) References Cited

U.S. PATENT DOCUMENTS

2007/0176154 A1*   8/2007   Murase .............. C08K 5/34928
252/601

FOREIGN PATENT DOCUMENTS

| JP | 03-157437 | A | 7/1991 |
| JP | 04-202451 | A | 7/1992 |
| JP | 04-318047 | A | 11/1992 |
| JP | 06-100749 | A | 4/1994 |
| JP | 10-330567 | A | 12/1998 |
| JP | 2001316549 |   * | 11/2001 |
| JP | 2001316549 | A | 11/2001 |
| JP | 2002138180 | A | 5/2002 |
| JP | 2002294089 | A | 10/2002 |

OTHER PUBLICATIONS

International Search Report from PCT/JP2014/001056 dated Jun. 3, 2014.

* cited by examiner

*Primary Examiner* — William Cheung
(74) *Attorney, Agent, or Firm* — Millen, White, Zelano and Branigan, P.C.

(57) ABSTRACT

A vinyl chloride resin composition for transparent products, comprising 100 parts by mass of the vinyl chloride resin, 0.01 to 10 parts by mass of the following component (A), 0.01 to 10 parts by mass of the following component (B) and 0.01 to 3 parts by mass of the following component (C);
(A) At least one kind of salt selected from organic acid zinc salts.
(B) At least one kind of compound selected from zinc-modified hydrotalcite compounds.
(C) At least one kind of compound selected from phosphite ester compounds.

6 Claims, No Drawings

VINYL CHLORIDE RESIN COMPOSITION FOR TRANSPARENT PRODUCTS

This application is the U.S. national phase under U.S.C. Section 371 of International Application No. PCT/JP2014/001056, filed Feb. 27, 2014, which claims priority to Japan Application No. 2013-049246 filed Mar. 12, 2013, the entire contents of each of which are hereby incorporated by reference.

TECHNICAL FIELD

The present invention relates to a vinyl chloride resin composition suitable for use in transparent products, and in particular, relates to a vinyl chloride resin composition for transparent products wherein heavy metal-based stabilizers containing heavy metals such as tin is not necessary to be used.

BACKGROUND ART

Vinyl chloride resin can be used for various uses since the hardness thereof can be easily adjusted by adding plasticizers. In particular, since hard vinyl chloride resin compositions having no plasticizer, or semi-hard vinyl chloride resin compositions having only a small amount of plasticizer have excellent rigidity, they are widely used for building materials or the like. Therefore, in the case of hard vinyl chloride resin compositions having no plasticizer and semi-hard vinyl chloride resin compositions having only a small amount of plasticizer, more advanced performances are required not only in working at high temperatures and pressures but also in heat stability and weather resistance as molded articles.

In addition, hard transparent molded articles obtained from hard vinyl chloride resin compositions have been used for a wide range of products such as containers, industrial boards, decorative boards, film and sheets, wherein glass-like transparencies are required. On the contrary, it has been known that vinyl chloride resin has disadvantages in that it is insufficient in stability against light and heat, therefore, a decomposition mainly caused by a dehydrohalogenation easily occurs when heat molding is carried out or when the products are used. In order to improve these disadvantages, attempts have been conventionally made wherein various stabilizers such as an organic acid metallic salt, an organic tin compound, an organic phosphite compound, an epoxy compound, a β-diketone compound, an antioxidant and an ultraviolet absorber are blended to improve the stability of vinyl chloride resin.

Conventionally, heavy metal-based stabilizers such as lead-based and cadmium-based stabilizers have been used from a viewpoint of an advantage in terms of cost or the like. Recently the interest in environmental problems has been growing, therefore, the toxicity and affection of the heavy metal or the like on the environment have come to problems and there has been a tendency to use barium-zinc composite stabilizers. However, in recent years an affection of barium on the environment have started to cause concern. Therefore, the replacement to further lower-toxic composite stabilizers such as calcium-zinc, magnesium-zinc or calcium-magnesium-zinc composite stabilizers is required.

From the viewpoints of environmental problems, a method of adding an organic acid calcium salt, an organic acid zinc salt, a basic phosphorous acid salt and/or a hydrotalcite compound into the vinyl chloride resin (Patent document 1), and a method of adding an organic acid alkaline earth metallic salt, an organic acid zinc salt, a basic zinc phosphate and/or a hydrotalcite compound into the vinyl chloride resin (Patent document 2) were proposed. However, even though these compounds are used in combination, the vinyl chloride resin, which can satisfy the performances of heat resistance and the like, could not be obtained. In addition, in these patent documents, there were no description with regard to the transparency at all, and also there was no suggestion of improvement in transparency at all.

Furthermore, there are proposed a vinyl chloride resin composition, which is able to foam, for foaming molded products wherein an inorganic filler, a zinc compound, a zinc-modified hydrotalcite compound and a thermal decomposition type organic foaming agent are added (Patent document 3), and a polyvinyl chloride resin composition for food wrapping wherein an adipic acid ester plasticizer, a calcium salt of organic carboxylic acid and a zinc-modified hydrotalcite compound are blended (Patent document 4). However, since there are no descriptions with regard to transparency at all in any of these documents, any knowledge with regard to the improvement of transparency could not be obtained from these documents.

In addition, tin-based stabilizers are proposed as a stabilizer which can enhance the transparency (Patent documents 5 and 6). However, tin is also not preferable from the viewpoints of affection on the environment and toxicity. Moreover, a lot of tin-based stabilizers are liquid. Therefore, when these tin-based stabilizers are used, there were problems in that not only lubricating properties of molten resin during mold-working decrease, but also the heat distortion temperature of molded object (a softening point) drops.

In cases of using stabilizers such as calcium-zinc-based, magnesium-zinc-based or calcium-magnesium-zinc-based stabilizers, coloring properties often become a problem.

As seen above, a vinyl chloride resin composition, which does not affect the environment negatively, and can provide a molded article excellent in coloring resistant properties and transparency has not been known yet.

PRIOR ART DOCUMENTS

Patent Documents

Patent document 1: JPH09-67489 A
Patent document 2: JP2003-160707 A
Patent document 3: JPH03-237140 A
Patent document 4: JPH06-100749 A
Patent document 5: JP1987-4739 A
Patent document 6: JP2008-01840 A

SUMMARY OF THE INVENTION

Problems to be Solved by the Invention

Therefore, the first object of the present invention is to provide a vinyl chloride resin composition for transparent products excellent in transparency, thermal stability and coloring resistant properties, without using heavy metal-based stabilizers such as lead-based, tin-based and barium-based stabilizers.

The second object of the present invention is to provide a transparent molded article obtained by molding the vinyl chloride resin composition that has, not only high transparency but also an excellent thermal stability, excellent coloring resistant properties and an excellent environmental adaptability.

Means to Solve the Problems

As a result of intensive studies for accomplishing said objects, the inventors have found that an excellent result can be obtained, when the specified amounts of an organic acid zinc salt, a zinc-modified hydrotalcite compound and a phosphite ester compound are contained in a vinyl chloride resin composition, thereby achieving the present invention.

Namely, the present invention is a vinyl chloride resin composition for transparent products, comprising 100 parts by mass of the vinyl chloride resin, 0.01 to 10 parts by mass of the following component (A), 0.01 to 10 parts by mass of the following component (B) and 0.01 to 3 parts by mass of the following component (C), and a transparent molded article obtained by molding said vinyl chloride resin composition:

(A) At least one kind of organic acid zinc salts,
(B) At least one kind of zinc-modified hydrotalcite compounds,
(C) At least one kind of phosphite ester compounds.

In the present invention, it is preferable that the organic acid zinc salt of the component (A) is a salt of organic carboxylic acid having 6 to 18 carbon atoms, and the component (C) is a phosphite ester compound having 12 to 32 carbon atoms.

Also, in the present invention, it is preferable that the component (B) is a zinc-modified hydrotalcite compound represented by the following general formula (1), and especially, it is more preferable that the component (B) does not contain an organic tin compound;

$$M_{y1}Zn_{y2}Al_x(OH)_2(CO_3)_{x/2}.mH_2O \quad (1)$$

wherein M represents magnesium, or magnesium and calcium, x, y1 and y2 are numbers satisfying the conditions represented by the following formulae respectively, m represents 0 or any positive numbers; $0<x\leq 0.5$, $y1+y2=1-x$, $y1\geq y2$, $0.3\leq y1<1$ and $0<y2<0.5$.

Effect of the Invention

Since the vinyl chloride resin composition for transparent products of the present invention (hereinafter, abbreviated as "the resin composition of the present invention") is excellent in transparency, thermal stability and coloring resistant properties, the molded article obtained by molding the resin composition of the present invention has high transparency, and is excellent in thermal stability and coloring resistant properties.

Modes for Carrying out the Invention

Hereinafter, the resin composition of the present invention is described in detail.

Examples of organic acid, constituting an organic acid zinc salt of the component (A) used for the present invention, are carboxylic acid, organophosphorus acid or phenols. Furthermore, the organic acid zinc salt may be any of acidic salts, basic salts or overbasic salts.

Examples of said carboxylic acid are caproic acid, caprylic acid, pelargonic acid, 2-ethylhexylic acid, capric acid, neodecanoic acid, undecylenic acid, lauric acid, myristic acid, palmitic acid, stearic acid, isostearic acid, 12-hydroxystearic acid, chlorostearic acid, 12-ketostearic acid, phenylstearic acid, ricinoleic acid, linoleic acid, linolenic acid, oleic acid, arachic acid, behenic acid, erucic acid, brassidic acid and similar acid, and also mixtures of naturally-produced acids listed above such as tallow fatty acid, palm oil fatty acid, wood oil fatty acid, soybean oil fatty acid and cotton seed oil fatty acid; benzoic acid, p-tert-butylbenzoic acid, ethylbenzoic acid, isopropylbenzoic acid, p-toluic acid, o-toluic acid, m-toluic acid, xylic acid, salicylic acid, 5-tert-octylsalicylic acid, naphthenic acid and cyclohexanecarboxylic acid or the like.

Examples of the organophosphorus acid are mono- or dioctylphosphoric acid, mono- or didodecylphosphoric acid, mono- or dioctadecylphosphoric acid, mono- or di(nonylphenyl)phosphoric acid, phosphonic acid nonylphenyl ester and phosphonic acid stearyl ester or the like. Examples of the phenols are phenol, cresol, ethylphenol, cyclohexylphenol, nonylphenol and dodecylphenol or the like.

With regard to organic acid zinc salts used as the component (A) in the present invention, only one kind of them may be used, or two or more kinds of them may be used together. However, from the viewpoints of thermal stability, transparency and coloring resistant properties in the resin composition of the present invention, it is preferable to use a zinc salt of organic carboxylic acid. In particular, it is preferable to use a zinc salt of organic carboxylic acid having 6 to 18 carbon atoms. It is the most preferable to use a zinc salt of organic carboxylic acid having 6 to 14 carbon atoms. Specific examples of preferable zinc salts of organic acid are zinc stearate, zinc laurate, zinc benzoate, zinc p-toluate and zinc oleate.

The content of the organic acid zinc salt used in the present invention, as the component (A), is 0.01 to 10 parts by mass relative to 100 parts by mass of vinyl chloride resin. However, from the viewpoints of transparency, thermal stability and coloring resistant properties in the resin composition of the present invention, it is preferable that said content is 0.01 to 5 parts by mass. 0.05 to 2 parts by mass is more preferable and 0.1 to 1.0 parts by mass is the most preferable. If the content is less than 0.01 parts by mass, the coloring resistant properties in the resin composition of the present invention is insufficient. If the content is more than 10 parts by mass, the transparency and thermal stability in the resin composition of the present invention are decreased.

The zinc-modified hydrotalcite compound used as the component (B) in the present invention is a double salt compound having magnesium, zinc and aluminum as a metallic component, or a double salt compound having magnesium, calcium, zinc and aluminum as a metallic component. In the present invention, from the viewpoint of transparency in particular, it is preferable to use the double salt compound having magnesium, zinc and aluminum as a metallic component.

The double salt compound is obtained by processing a hydrotalcite compound using a zinc compound in a normal manner. Said double salt compound may be a zinc-modified hydrotalcite compound obtained by processing with a zinc compound during synthesizing or after synthesizing said hydrotalcite compound. These zinc-modified hydrotalcite compounds are described in, for example, JP1971-2280 B, JP1972-32198 B, JP1975-30039 B, 1973-29477 B and JP1976-29129 B. AS a matter of course, products on the market can be also used in the present invention.

From the viewpoints of processing properties, thermal stability and transparency concerning the resin composition in the present invention, it is preferable to use zinc-modified hydrotalcite compounds of the component (B) represented by the following general formula (I).

$$M_{y1}Zn_{y2}Al_x(OH)_2(CO_3)_{x/2}.mH_2O \quad (I)$$

wherein, M represents magnesium, or magnesium or calcium, however, it is preferable that M represents magnesium, from the viewpoint of transparency in the resin composition of the present invention. X, y1 and y2 respectively represent numbers satisfying conditions represented by the following relational formulae, m represents 0 or an arbitrary positive number.

$0<x\leq 0.5$, $y1+y2=1-x$, $y1\geq y2$, $0.3\leq y1<1$ and $0<y2<0.5$

Specific examples of the zinc-modified hydrotalcite compounds used in the present invention are as follows.

$Mg_{0.38}Zn_{0.3}Al_{0.32}(OH)_2(CO_3)_{0.16}.0.2H_2O$ $Mg_{0.45}Zn_{0.23}Al_{0.32}(OH)_2(CO_3)_{0.16}$ $Mg_{0.48}Zn_{0.18}Al_{0.34}(OH)_2(CO_3)_{0.17}$ $Mg_{0.48}Zn_{0.2}Al_{0.32}(OH)_2(CO_3)_{016}$ $Mg_{0.5}Zn_{0.17}Al_{0.33}(OH)_2(CO_3)_{0.165} \cdot 0.45H_2O$ $Mg_{0.5}Zn_{0.18}Al_{0.32}(OH)_2(CO_3)_{0.16}$ $Mg_{0.5}Zn_{0.2}Al_{0.3}(OH)_2(CO_3)_{0.16}$ $Mg_{0.5}Zn_{0.2}Al_{0.3}(OH)_2(CO_3)_{0.15} \cdot 0.52H_2O$ $Mg_{0.5}Zn_{0.25}Al_{0.25}(OH)_2(CO_3)_{0.125}$ $Mg_{0.51}Zn_{0.17}Al_{0.32}(OH)_2(CO_3)_{0.16}$ $Mg_{0.52}Zn_{0.16}Al_{0.32}(OH)_2(CO_3)_{0.16} \cdot 0.5H_2O$ $Mg_{0.55}Zn_{0.15}Al_{0.32}(OH)_2(CO_3)_{0.15}$ $Mg_{0.6}Zn_{0.14}Al_{0.26}(OH)_2(CO_3)_{0.13}$ $Mg_{0.6}Zn_{0.16}Al_{0.24}(OH)_2(CO_3)_{0.12}$ $Mg_{0.6}Zn_{0.2}Al_{02}(OH)_2(CO_3)_{0.1}$ $Mg_{0.4}Ca_{0.1}Zn_{0.18}Al_{032}(OH)_2(CO_3)_{0.16}$ $Mg_{0.3}Ca_{0.2}Zn_{0.2}Al_{0.3}(OH)_2(CO_3)_{0.15}$ $Mg_{0.5}Zn_{0.17}Al_{0.33}(OH)_2(CO_3)_{0.17} \cdot 0.5H_2O$ $Mg_{0.5}Zn_{0.17}Al_{0.33}(OH)_2(CO_3)_{0.17} \cdot 0.42H_2O$ $Mg_{0.6}Zn_{0.16}Al_{0.24}(OH)_2(CO_3)_{0.12} \cdot 0.45H_2O$ $Mg_{0.5}Zn_{0.25}Al_{0.25}(OH)_2(CO_3)_{0.13} \cdot 0.39H_2O$ $Mg_{0.5}Zn_{0.17}Al_{0.33}(OH)_2(CO_3)_{0.17}$ $Mg_{0.5}Zn_{0.25}Al_{0.25}(OH)_2(CO_3)_{0.13}$ Examples of products on the market are Alkamizer 4 (Alkamizer P-93: a name of product manufactured by Kyowa Chemical Industry Co., Ltd) or the like. In particular, it is preferable to use the Alkamizer 4 (Alkamizer P-93), from the viewpoint of transparency. In the present invention, only one kind of these zinc-modified hydrotalcite compounds may be used, or two or more kinds of them may be used together.

It is preferable that a refractive index of the zinc-modified hydrotalcite compound used as the component (B) in the present invention is 1.52 to 1.56 from the viewpoint of transparency.

In the present invention, the zinc-modified hydrotalcite compounds can also be used, of which surfaces are coated with higher fatty acids such as stearic acid, higher fatty acid metallic salts such as oleic acid alkali metallic salt, organic sulfonic acid metallic salts such as dodecyl benzene sulfonic acid alkali metallic salts, higher fatty acid amides, higher fatty acid esters, waxes or the like.

The amount of use of the zinc-modified hydrotalcite compound, which is used as the component (B) in the present invention, is 0.01 to 10 parts by mass relative to 100 parts by mass of vinyl chloride resin. From the viewpoints of transparency, thermal stability and coloring resistant properties of the present resin composition, it is preferable that the amount of use thereof is 0.05 to 5 parts by mass and 0.1 to 5 parts by mass is more preferable. When the amount of use thereof is less than 0.01 parts by mass, the thermal stability in the resin composition of the present invention is insufficient. When it is more than 10 parts by mass, a decrease in performance such as a decrease of coloring resistant properties of the present resin composition is caused.

Next, a phosphite ester compound, which is used as the component (C) in the present invention, will be described.

Examples of phosphite ester compounds that can be used in the present invention are trialkyl phosphite, dialkyl phosphite, dialkyl allyl phosphite, alkyl allyl phosphite, alkyl diallyl phosphite, diallyl phosphite and triallyl phosphite. In the present invention, both of triester and diester can be used. However, from the viewpoints of transparency and coloring resistant properties of the present resin composition, it is preferable to use the triester. Also, thioester can be used.

Examples of said phosphite ester compounds are triphenyl phosphite, tricresyl phosphite, tris(2,4-di-tert-butylphenyl) phosphite, tris(nonylphenyl)phosphite, tris(dinonylphenyl) phosphite, tris(mono- and di-mixed nonylphenyl)phosphite, diphenyl phosphite, 2,2'-methylenebis(4,6-di-tert-butylphenyl)octyl phosphite, diphenyldecyl phosphite, diphenyl(2-ethylhexyl)phosphite, diphenyl tridecyl phosphite, diphenyl ($C_{12}$~$C_{15}$ mixed alkyl)phosphite, phenyl diisodecyl phosphite, phenylbis(isotridecyl)phosphite, triethyl phosphite, tributyl phosphite, tris(2-ethylhexyl) phosphite, tris (decyl) phosphite, trilauryl phosphite, tris(tridecyl) phosphite, trioleyl phosphite, tristearyl phosphite, diethyl phosphite, dibutyl phosphite, dilauryl phosphite, bis(2-ethylhexyl) phosphite, dioleyl phosphite, trilauryl trithio phosphite, bis(neopentyl glycol)-1,4-cyclohexane dimethyl diphosphite, bis(2,4-di-tert-butylphenyl)pentaerythritol diphosphite, bis(2,6-di-tert-butyl-4-methylphenyl)pentaerythritol diphosphite, distearyl pentaerythritol diphosphite, phenyl-4,4'-isopropylidene diphenol•pentaerythritol diphosphite, tetra($C_{12}$~$C_{15}$ mixed alkyl)-4,4'-isopropylidene diphenyl diphosphite, hydrogenated-4,4'-isopropylidene diphenol polyphosphite, bis(octylphenyl)•bis[4,4'-n-butylidene bis(2-tert-butyl-5-methylphenol)]•1,6-hexanediol•diphosphite, tetradecyl•4,4'-butylidene bis(2-tert-butyl-5-methylphenol)diphosphite, hexa(tridecyl)•1,1,3-tris (2-methyl-5-tert-butyl -4-hydroxyphenyl) butane•triphosphite, 9,10-dihydro-9-oxa-10-phosphaphenanthrene-10-oxide and 2-butyl-2-ethylpropane diol•2,4,6-tri-tert-butylphenol monophosphite.

In the present invention, with regard to phosphite ester compounds used as the component (C), only one kind of them may be used, or two or more kinds of them may be used together. From the viewpoints of thermal stability, transparency and coloring resistant properties of the resin composition of the present invention, it is preferable to use a phosphite ester compound having 12 to 32 carbon atoms, and it is more preferable to use a phosphite ester compound having 18 to 28 carbon atoms.

The amount of use of phosphite ester compounds of the component (C) in the present invention is 0.01 to 3 parts by mass relative to 100 parts by mass of vinyl chloride resin. From the viewpoints of thermal stability, transparency and coloring resistant properties of the resin composition of the present invention, it is preferable to use 0.05 to 2 parts by mass of phosphite ester compound, and it is particularly preferable to use 0.2 to 1.5 parts by mass of it. When the amount of use is less than 0.01 parts by mass, the transparency and coloring resistant properties of the resin composition of the present invention are insufficient. When it is more than 3 parts by mass, decreases in performances, such as decreases of transparency and coloring resistant properties of the resin composition of the present invention, are caused.

It is preferable that the resin composition of the present invention further contains a lubricant from the viewpoint of workability.

The lubricants used for the present invention can be selected as appropriate from publicly known lubricants. Examples of said publicly known lubricants are hydrocarbon lubricants such as low molecular weight wax, paraffin wax, polyethylene wax, chlorinated hydrocarbon and fluorocarbon; natural wax lubricants such as carnauba wax and candelilla wax; fatty acid lubricants such as a higher fatty acid like lauric acid, stearic acid and behenic acid, or an oxy-fatty acid like hydroxystearic acid; aliphatic amide lubricants such as aliphatic amide compounds like stearylamide, laurylamide and oleylamide, or alkylene bis aliphatic amide like methylenebisstearylamide and ethylenebisstearylamide; fatty acid alcohol ester lubricants such as fatty acid monovalent alcohol ester compounds like stearyl stearate, butyl stearate and distearyl phthalate, or fatty acid polyalcohol ester compounds like glycerol tristearate, sorbitan tristearate, pentaerythritol tetrastearate, dipentaerythritol hexastearate, polyglycerin polyricinolate and cured castor oil, or composite ester compounds of monovalent fatty acids like adipic acid • stearic acid ester of dipentaerythritol, polybasic organic acid and polyalcohol; fatty alcoholic lubricants such as stearyl alcohol, lauryl alcohol and palmityl alcohol; metallic soaps; a montanic acid lubricants such as partially saponified montanic acid ester; acrylic lubricants; and silicone oil. Only one kind of these lubricants may be used or two or more kinds of them may be used together.

In the present invention, it is preferable to use fatty acid alcohol ester lubricants such as composite ester compounds of monovalent fatty acid with polyalcohol, and/or polybasic organic acid with polyalcohol, from the viewpoint of transparency in particular. In cases where lubricants are used for the resin composition of the present invention, it is preferable that the content of lubricant is 0.01 to 10 parts by mass relative to 100 parts by mass of vinyl chloride resin. Especially, 0.05 to 5 parts by mass is preferable. When the content of lubricant is less than 0.01 parts by mass, the workability of the resin composition in the present invention may be insufficient in some cases. When it is more than 10 parts by mass, a decrease in performance such as a transparency decrease is caused.

From the viewpoint of workability, it is preferable that the resin composition of the present invention further contains a processing aid. The processing aid used for the present invention can be selected as appropriate from publicly known processing aids. In the present invention, it is preferable in particular to use acrylic acid processing aids.

Examples of processing aids used in the present invention are a homopolymer or a copolymer of alkyl methacrylate such as methyl methacrylate, ethyl methacrylate and butyl methacrylate; a copolymer of said alkyl methacrylate with alkyl acrylate such as methyl acrylate, ethyl acrylate and butyl acrylate; a copolymer of said alkyl methacrylate with an aromatic vinyl compound such as styrene, a-methyl styrene and vinyl toluene; and a copolymer of said alkyl methacrylate with a vinyl cyanogen compound such as acrylonitrile and methacrylonitrile. Only one kind of these processing aids may be used or two or more kinds of them may be used together.

In cases where the processing aid is used for the resin composition of the present invention, it is preferable that the amount of use thereof is 0.01 to 10 parts by mass relative to 100 parts by mass of vinyl chloride resin and 0.05 to 5 parts by mass is preferable in particular. When the amount of processing aid used is less than 0.01 parts by mass, improvement effects of workability may be insufficient. When the amount of processing aid used is more than 10 parts by mass, a decrease in performance such as a transparency decrease is caused.

From the viewpoint of coloring resistant properties, it is preferable that the resin composition of the present invention further contains a β-diketone compound.

Examples of said β-diketone compound are acetylacetone, triacetyl methane, 2,4,6-heptatrione, butanoyl acetyl methane, lauroyl acetyl methane, palmitoyl acetyl methane, stearoyl acetyl methane, phenylacetyl acetyl methane, dicyclohexyl carbonyl methane, benzoyl formyl methane, benzoyl acetyl methane, dibenzoyl methane, octyl benzoyl methane, stearoyl benzoyl methane, bis(4-octyl benzoyl)methane, benzoyl diacetyl methane, 4-methoxybenzoyl benzoyl methane, bis(4-carboxymethyl benzoyl)methane, 2-carboxymethylbenzoyl acetyl octyl methane, dehydroacetic acid, cyclohexane-1,3-dione, 3 ,6-dimethyl-2,4-dioxycyclohexane-1-carboxylic acid methyl, 2-acetyl cyclohexanone, dimedone and 2-benzoyl cyclohexane.

In the present invention, a metallic salt of said β-diketone compound can also be used. Examples of metallic species which can provide said β-diketone metallic salt are alkali metals such as lithium, sodium and potassium; magnesium, calcium, strontium, zinc and aluminum. In the resin composition of the present invention, from the viewpoint of coloring resistant properties and transparency, it is preferable to use dibenzoyl methane and stearoyl benzoyl methane as the β-diketone compound.

In cases where the β-diketone compound is used for the resin composition of the present invention, it is preferable that the amount used thereof is 0.01 to 10 parts by mass relative to 100 parts by mass of vinyl chloride resin and particularly 0.05 to 5 parts by mass is preferable. When the amount of β-diketone compound used is less than 0.01 parts by mass, improvement effects of coloring resistant properies may be insufficient. When the amount of β-diketone compound used is more than 10 parts by mass, decreases in performance such as a thermal stability decrease and a transparency decrease are caused.

From the viewpoints of thermal stability and coloring resistant properties, it is preferable that the resin composition of the present invention further contains a phenolic antioxidant. Examples of said phenolic antioxidant are 2,6-di-tert-butyl-p-cresol, 2,6-diphenyl-4-octadecyloxyphenol, stearyl(3,5-di-tert-butyl-4-hydroxyphenyl)-propionate, distearyl(3,5-di-tert-butyl-4-hydroxybenzyl)phosphonate, thiodiethylene glycol bis [(3,5-di-tert-butyl-4-hydroxyphenyl)-propionate], 1,6-hexamethylenebis [(3,5-di-tert-butyl-4-hydroxyphenyl) propionate],1,6-hexamethylenebis[(3 ,5-di-tert-butyl-4-hydroxyphenyl) propionic amide], 4,4'-thiobis(6-tert-butyl-m-cresol), 2,2'-methylenebis (4-methyl-6-tert-butylphenol), 2,2'-methylenebis (4-ethyl-6-tert-butylphenol), bis[3,3-bis(4-hydroxy-3-tert-butylphenyl)butylic acid]glycol ester, 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris (2-methyl-4-hydroxy-5-tert-butylphenyl)butane, bis [2-tert-butyl-4-methyl-6-(2-hydroxy-3-tert-butyl-5-methylbenzyl) phenyl]terephthalate, 1,3,5-tris(2,6-dimethyl-3-hydroxy-4-tert-butylbenzyl) isocyanurate,1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3',5'-di-tert-butyl-4'-hydroxyphenyl) propionate]methane, 2-tert-butyl-4-methyl-6-(2-acryloyloxy-3-tert-butyl-5-methylbenzyl)phenol, 3,9-bis[1,1-dimethyl-2-{(3-tert-butyl-4-hydroxy-5-methylphenyl) propionyloxy}ethyl]-2,4,8,10-tetraoxaspiro[5,5]undecane and triethylene glycol -bis[(3-tert-butyl-4-hydroxy-5-methylphenyl)propionate].

In cases where the phenolic antioxidant is used for the resin composition of the present invention, it is preferable that the amount used thereof is 0.01 to 10 parts by mass relative to 100 parts by mass of vinyl chloride resin and particularly 0.05 to 5 parts by mass is preferable. When the content of phenolic antioxidant is less than 0.01 parts by mass, improvement effects of coloring resistant properties may be insufficient. When the content of phenolic antioxidant is more than 10 parts by mass, a decrease in performance such as a transparency decrease is caused.

It is preferable that the resin composition of the present invention further contains one or more kind of sugar alcohol. Examples of said sugar alcohol are mannitol, maltitol, lactitol, sorbitol, erythritol, glycerin, xylitol and inositol. From the viewpoints of thermal stability, coloring resistant properties and transparency, it is preferable to use mannitol, maltitol and lactitol.

In cases where the sugar alcohol is used for the resin composition of the present invention, it is preferable that the amount used thereof is 0.001 to 1 parts by mass relative to 100 parts by mass of vinyl chloride resin. From the viewpoints of thermal stability, coloring resistant properties and transparency of the resin composition of the present invention, it is preferable to use 0.005 to 0.5 parts by mass of sugar alcohol and it is particularly preferable to use 0.01 to 0.3 parts by mass of sugar alcohol.

When the resin composition of the present invention is made, the timing for blending the components from (A) to (C), and in some cases, further a lubricant and other optional addition ingredients with the vinyl chloride resin is not particularly limited. For example, after two or more kinds of components selected from the components (A)-(C), a lubricant and other optional addition ingredients, are made into one pack in advance, the packed components may be blended with the vinyl chloride resin. Or, each component may be blended with the vinyl chloride resin. When components are made into one pack, each component may be blended after grinding respectively, or may be ground after blending.

Examples of vinyl chloride resin used for the present invention are vinyl chloride resins such as polyvinyl chloride, chlorinated polyvinyl chloride, polyvinylidene chloride, chlorinated polyethylene, chlorinated polypropylene, chlorinated rubber, vinyl chloride-vinyl acetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride terpolymer, vinyl chloride-alkyl-, -cycloalkyl- or -aryl-maleimide copolymer, vinyl chloride-styrene-acrylonitrile terpolymer, vinyl chloride-butadiene copolymer, vinyl chloride-isoprene copolymer, vinyl chloride-chlorinated propylene copolymer, vinyl chloride-vinylidene chloride-vinyl acetate terpolymer, vinyl chloride-acrylic acid ester copolymer, vinyl chloride-maleic acid ester copolymer, vinyl chloride-methacrylic acid ester copolymer, vinyl chloride-acrylonitrile copolymer and vinyl chloride-urethane copolymer; and blended products of said vinyl chloride resins with one kind selected from $\alpha$-olefin polymers such as polyethylene, polypropylene, polybutene and poly-3-methylbutene, or polyolefins such as ethylene-vinyl acetate copolymer and ethylene-propylene copolymer, and copolymers thereof, or copolymers of polystyrene, acrylic resin and styrene with other monomers (such as maleic anhydride, butadiene and acrylonitrile), or acrylonitrile-butadiene-styrene copolymer, or methacrylic ester-butadiene-styrene copolymer, or polyurethane.

Metal-based stabilizers generally used for vinyl chloride resin can be added to the vinyl chloride resin composition of the present invention. However, it is not preferable to add lead-based stabilizers, (organic) tin-based stabilizers, cadmium-based stabilizers and barium-based stabilizers, from the viewpoints of affection on the environment and toxicity.

Examples of metallic stabilizers available for the present invention are organic acid metallic salts of metals other than lead, tin, cadmium and barium, and composite stabilizers thereof. These organic acid metallic salts can be optionally used within the range where the effects of the present invention are not negatively affected. However, in cases where these organic acid metallic salts are added, the transparency of resin composition of the present invention tends to decrease.

Examples of organic acid metallic salts available for the present invention, which are used as the metallic stabilizers, are metallic salts etc. made of carboxylic acid, organic phosphoric acids or phenols and metal (Li, Na, K, Ca, Mg, Sr, Zn, Cs and Al). Examples of the carboxylic acid are, for example, caproic acid, caprylic acid, pelargonic acid, 2-ethylhexylic acid, capric acid, neodecanoic acid, undecylenic acid, lauric acid, myristic acid, palmitic acid, stearic acid, isostearic acid, 12-hydroxystearic acid, chlorostearic acid, 12-ketostearic acid, phenylstearic acid, ricinoleic acid, linoleic acid, linolenic acid, oleic acid, arachidic acid, behenic acid, erucic acid, brassidic acid and similar acids; and also mixtures of said naturally-produced acids such as tallow fatty acid, coconut oil fatty acid, tung oil fatty acid, soybean fatty acid and cotton seed oil fatty acid; benzoic acid, p-t-butylbenzoic acid, ethylbenzoic acid, isopropylbenzoic acid, toluic acid, xylic acid, salicylic acid, 5-t-octylsalicylic acid, naphtheric acid, cyclohexanecarboxylic acid or the like.

In addition, examples of said organic phosphoric acids are, for example, mono- or di-octylphosphoric acid, mono- or di-dodecylphosphoric acid, mono- or di-octadecylphosphoric acid, mono- or di-(nonylphenyl)phosphoric acid, phosphonic acid nonylphenyl ester, phosphonic acid stearyl ester or the like.

Furthermore, examples of said phenols are phenol, cresol, ethylphenol, cyclohexylphenol, nonylphenol and dodecylphenol or the like. These organic acid metallic salts may be a normal salt, an acid salt, a basic salt or an overbasic complex.

The resin composition of the present invention can provide a molded product having excellent physical properties such as a high transparency and a high softening point, therefore, it can be preferably used for hard resin use without blending a plasticizer. However, the resin composition of the present invention can be used for semi-hard resin use by adding 50 parts by mass or less of plasticizer relative to 100 mass parts of vinyl chloride resin. When a plasticizer is used in the present invention, the plasticizer usually used for vinyl chloride resin can be used as appropriate within the range where the effects of the present invention are not negatively affected.

Examples of said plasticizers are phthalate plasticizers such as dibutyl phthalate, butylhexyl phthalate, diheptyl phthalate, dioctyl phthalate, diisononyl phthalate, diisodecyl phthalate, dilauryl phthalate, dicyclohexyl phthalate and dioctyl terephthalate; adipate plasticizers such as dioctyl adipate, diisononyl adipate, diisodecyl adipate and di(butyldiglycol) adipate; phosphate plasticizers such as triphenyl phosphate, tricresyl phosphate, trixylenyl phosphate, tri(isopropylphenyl)phosphate, triethyl phosphate, tributyl phosphate, trioctyl phosphate, tri(butoxyethyl)phosphate and octyldiphenyl phosphate; polyester plasticizers obtained by reacting polyalcohols, such as ethylene glycol, diethylene glycol, triethylene glycol, 1,2-propylene glycol, 1,3-propylene glycol, 1,3-butanediol, 1,4-butanediol, 1,5-hexanediol, 1,6-hexanediol and neopentyl glycol, with dibasic acids such as oxalic acid, malonic acid, succinic acid, glutaric acid, adipic acid, pimelic acid, suberic acid, azelaic acid, sebacic acid, phthalic acid, isophthalic acid and terephthalic acid, if necessary, together with a stopper such as monohydric alcohol and monocarboxylic acid; as other examples, a tetrahydrophthalic acid plasticizer, an azelaic acid plasticizer, a sebacic acid plasticizer, a stearic acid plasticizer, a citric acid plasticizer, a trimellitic acid plasticizer, a pyromellitic acid plasticizer and a biphenylene polycarboxylic acid plasticizer or the like.

In addition, the resin composition of the present invention can be blended with various kinds of additive agents, which are generally used as an additive agent for vinyl chloride resin, for example, a sulfuric antioxidant, a hydrotalcite compound other than the zinc-modified hydrotalcite compound used as the component (B), an epoxy compound, polyols, sugars, an ultraviolet absorber, a hindered amine light stabilizer, an impact modifier, a filler, a flame retardant and a flame-retardant auxiliary agent or the like, within the range where the effects of the present invention are not negatively affected.

Examples of said sulfuric antioxidant are dialkyl thiodipropionates such as dilauryl, dimyristyl, myristyl stearyl and distearyl ester of thiodi propionic acid; β-alkyl mercapto propionic acid esters of polyol such as pentaerythritol tetra (β-dodecyl mercapto propionate).

The compounds represented by the following formula, for example, can be cited as the hydrotalcite compound other than the zinc-modified hydrotalcite used as the component (B).

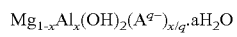

$$Mg_{1-x}Al_x(OH)_2(A^{q-})_{x/q} \cdot aH_2O$$

wherein q is 1 or 2, $A^{q-}$ is an anion having the value q, namely $(CO_3)^{2-}$ or $(ClO_4)^-$, X represents $0<X\leq0.5$, and "a" represents 0 or a positive number.

Representative examples of the hydrotalcite other than the zinc-modified hydrotalcite compound used as the component (B) are as follows:

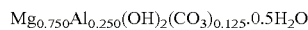

$$Mg_{0.750}Al_{0.250}(OH)_2(CO_3)_{0.125} \cdot 0.5H_2O$$

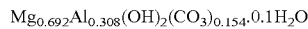

$$Mg_{0.692}Al_{0.308}(OH)_2(CO_3)_{0.154} \cdot 0.1H_2O$$

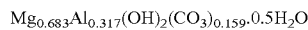

$$Mg_{0.683}Al_{0.317}(OH)_2(CO_3)_{0.159} \cdot 0.5H_2O$$

$$Mg_{0.667}Al_{0.333}(OH)_2(CO_3)_{0.167} \cdot 0.1H_2O$$

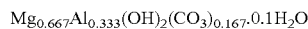

$$Mg_{0.750}Al_{0.250}(OH)_2(ClO_4)_{0.250} \cdot 0.5H_2O$$

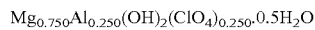

$$Mg_{0.692}Al_{0.308}(OH)_2(ClO_4)_{0.308} \cdot 0.1H_2O$$

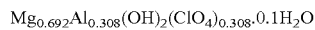

$$Mg_{0.667}Al_{0.333}(OH)_2(ClO_4)_{0.333} \cdot 0.1H_2O$$

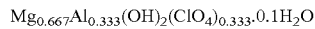

Examples of commercial products are DHT-4A (manufactured by Kyowa Chemical Industry Co., Ltd.), and Magceler-1 (manufactured by Kyowa Chemical Industry Co., Ltd.) or the like.

Examples of said epoxy compounds are, for example, epoxidized animal and plant oils such as epoxidized soybean oil, epoxidized linseed oil, epoxidized tung oil, epoxidized fish oil, epoxidized beef tallow oil, epoxidized castor oil and epoxidized safflower oil; epoxy compounds such as epoxidized methyl stearate, epoxidized butyl stearate, epoxidized 2-ethylhexyl stearate, epoxidized stearyl stearate, epoxidized polybutadiene, tris(epoxypropyl)isocyanurate, epoxidized tall oil fatty acid ester, epoxidized linseed oil fatty acid ester, bisphenol A diglycidyl ether, vinylcyclohexene diepoxide, dicyclohexene diepoxide, 3,4-epoxycyclohexylmethyl and epoxycyclohexane carboxylate.

Examples of said polyol compounds are trimethylolpropane, ditrimethylolpropane, pentaerythritol, dipentaerythritol, polypentaerythritol, stearic acid half ester of pentaerythritol or dipentaerythritol, bis(dipentaerythritol)adipate, diglycerol and tris(2-hydroxyethyl)isocyanurate.

Examples of sugars are xylose, sucrose, trehalose, fructose, maltose and lactose.

Examples of said ultraviolet absorber are 2-hydroxybenzophenones such as 2,4-dihydroxybenzophenone, 2-hydroxy-4-methoxybenzophenone, 2-hydroxy-4-octoxybenzophenone and 5,5'-methylenebis (2-hydroxy-4-methoxybenzophenone); 2-(2-hydroxyphenyl) benzotriazoles such as 2-(2-hydroxy-5-methylphenyl) benzotriazole, 2-(2-hydroxy-5-tert-octylphenyl) benzotriazole, 2-(2-hydroxy-3 ,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylenebis(4-tert-octyl-6-benzotriazolyl)phenol and polyethylene glycol ester of 2-(2-hydroxy-3-tert-butyl-5-carboxyphenyl)benzotriazole; benzoates such as phenyl salicylate, resorcinol monobenzoate, 2,4-di-tert-butylphenyl-3,5-di-tert-butyl-4-hydroxybenzoate and hexadecyl-3 ,5-di-tert-butyl-4-hydroxybenzoate; substituted oxanilides such as 2-ethyl-2'-ethoxyoxanilide and 2-ethoxy-4'-dodecyloxanilide; cyanoacrylates such as ethyl-α-cyano-β,β-diphenylacrylate and methyl-2-cyano-3-methyl-3-(p-methoxyphenyl)acrylate.

Examples of said hindered amine light stabilizer are hindered amine compounds such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, tetrakis(2,2,6,6-tetramethyl-4-piperidyl)butanetetra carboxylate, tetrakis(1,2,2,6,6-pentamethyl-4-piperidyl)butanetetra carboxylate, bis(1,2,2,6,6-pentamethyl-4-piperidyl) di(tridecyl)-1,2,3,4-butanetetracarboxylate, bis(1,2,2,6,6-pentamethyl-4-piperidyl)-2-butyl-2-(3,5-di -tert-butyl-4-hydroxybenzyl) malonate, 1-(2-hydroxyethyl)-2,2,6,6-tetramethyl-4-piperidynol/ diethyl succinate condensation product, 1,6-bis (2,2,6,6-tetraethyl-4-piperidylamino)hexane/ dibromoethane condensation product, 1,6-bis(2,2,6,6-tetramethyl-4-piperidylamino)hexane/ 2,4-dichloro-6-morpholino-s-triazine condensation product, 1,6-bis(2,2,6,6-tetramethyl-4-piperidylamino)hexane/2,4-dichloro-6-tert-octylamino-s-triazine condensation product, 1,5,8,12-tetrakis[2,4-bis(N-butyl-N-(2,2,6,6-tetramethyl-4-piperidyl) amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl) amino)-s-triazine-6-ylamino] undecane and 1,6,11-tris[2,4-bis(N-butyl-N-(1,2,2,6,6-pentamethyl-4piperidyl) amino)-s-triazine-6-ylamino] undecane.

Examples of said impact modifier are polybutadiene, polyisoprene, polychloroprene, fluorine-containing rubber, styrene-butadiene copolymer rubber, methyl methacrylate-butadiene-styrene copolymer, methyl methacrylate- butadiene-styrene graft copolymer, acrylonitrile styrene-butadiene copolymer rubber, acrylonitrile styrene-butadiene graft copolymer, styrene-butadiene-styrene block copolymer rubber, styrene-isoprene-styrene copolymer rubber, styrene-ethylene- butylenes-styrene copolymer rubber, ethylene-propylene copolymer rubber, ethylene-propylene-diene copolymer rubber (EPDM), silicone-containing acrylic rubber, silicone/acrylic complex rubber graft copolymer and silicone rubber or the like. In this regard, examples of diene in said ethylene-propylene-diene copolymer rubber(EPDM) are 1,4-hexanediene, dicyclopentadiene, methylene norbornene, ethylidene norbornene and propenyl norbornene or the like.

Specific examples of said fillers are calcium carbonate, calcium oxide, calcium hydroxide, zinc hydroxide, zinc carbonate, zinc sulfide, magnesium oxide, magnesium hydroxide, magnesium carbonate, aluminum oxide, aluminum hydroxide, sodium alminosilicate, hydrocalumite; mineral silicates such as aluminum silicate, magnesium silicate, calcium silicate and zeolite; activated clay, talc, clay, red iron oxide, asbestos, antimony trioxide, silica, glass beads, mica, sericite, glass flake, asbestos, wollastonite, potassium titanate, PMF, satin spar, zonolite, MOS, phosphate fiber, glass fiber, carbon fiber and aramid fiber or the like.

Examples of said flame retardants and flame-retardant auxiliary agents are a triazine-ring containing compound, a metallic hydroxide, and also an inorganic phosphorus, a halogen flame retardant, a silicone flame retardant, a phosphoric acid ester flame retardant, a condensed phosphoric acid ester flame retardant, an intumescent flame retardant, an antimony oxide such as an antimony trioxide, other inorganic flame-retardant auxiliary agents and organic flame-retardant auxiliary agents.

Examples of said triazine-ring containing compound are melamine, ammeline, benzoguanamine, acetoguanamine, phthalodiguanamine, melamine cyanurate, melamine pyrophosphate, butylenediguanamine, norbornenediguanamine, methylenediguanamine, ethylenedimelamine, trimethylenedimelamine, tetramethylenedimelamine, hexamethylenedimelamine and 1,3-hexylenedimelamine or the like.

Examples of said metallic hydroxide are magnesium hydroxide, aluminum hydroxide, calcium hydroxide, barium hydroxide, zinc hydroxide and Kisuma 5A (commercial name of magnesium hydroxide: manufactured by Kyowa Chemical Industry Co., Ltd).

Examples of said phosphoric acid ester flame retardant are trimethyl phosphate, triethyl phosphate, tributyl phosphate, tributoxyethyl phosphate, tris-chloroethyl phosphate, tris-dichloropropyl phosphate, triphenyl phosphate, tricresyl phosphate, cresyl diphenyl phosphate, trixylenyl phosphate, octyldiphenyl phosphate, xylenyldiphenyl phosphate, tris-isopropylphenyl phosphate, 2-ethylhexyldiphenyl phosphate, t-butylphenyldiphenyl phosphate, bis(t-butylphenyl)phenyl phosphate, tris(t-butylphenyl)phosphate, isopropylphenyldiphenyl phosphate, bis (isopropylphenyl) diphenyl phosphate and tris (isopropylphenyl)phosphate.

Examples of said condensation phosphoric acid ester flame retardant are 1,3-phenylene bis(di-phenylphosphate), 1,3-phenylene bis (di-xylenylphosphate) and bisphenol A bis(diphenylphosphate). Examples of said intumescent flame retardant are ammonium salt and amine salt of (poly)phosphoric acid such as ammonium polyphosphate, melamine polyphosphate, piperazine polyphosphate, ammonium pyrophosphate, melamine pyrophosphate and piperazine pyrophosphate.

Examples of said other inorganic flame-retardant auxiliary agents are inorganic compounds such as titanium oxide, aluminum oxide, magnesium oxide and talc, and their surface-treated products. For example, various types of products on the market such as TIPAQUE R-680 (commercial name of titanium oxide manufactured by ISHIHARA SANGYO Co., LTD.) and Kyowa MAG 150(commercial name of magnesium oxide manufactured by Kyowa Chemical Industry Co., Ltd) can be used.

Examples of said other organic flame-retardant auxiliary agents are pentaerithritol and dipentaerithritol.

Stabilization auxiliary agents generally used for vinyl chloride resins can be added to the vinyl chloride resin composition for transparent products of the present invention within the range where the effects of the present invention are not negatively affected. Examples of such stabilization auxiliary agents are diphenylthiourea, anilinodithiotriazine, melamine, benzoic acid, cinnamic acid, p-tert-butylbenzoic acid, zeolite and perchlorate or the like.

The vinyl chloride resin composition for transparent products of the present invention can further blend additives usually used for the vinyl chloride resin, if necessary, within the range where the effects of the present invention are not negatively affected. Examples of said additives are a crosslinking agent, an antistatic agent, a tarnish inhibitor, a plate-out inhibitor, a surface treatment agent, a fluorescent agent, a mildewcide, a disinfectant, a foaming agent, a metal deactivator, a mold lubricant, a pigment, an antioxidant and a light stabilizer.

The vinyl chloride resin composition for transparent products of the present invention can be used without relation to the processing method for vinyl chloride resin. For example, it can be preferably used for methods such as a rolling process method, an extrusion process method, a melt casting method and a pressure molding process method.

Hereafter, the present invention will be explained further in detail using examples and comparative examples. However, the present invention should not be limited by these examples at all.

EXAMPLES FROM 1 TO 21 AND COMPARATIVE EXAMPLES FROM 1 TO 3

After blending each component described in the following Tables from 1 to 3 using the Henschel Mixer, the mixture was kneaded for 3 minutes with a roll under the condition of 190° C.×30 rpm (rotation speed of roll)×0.6 mm (thickness of sheet) to manufacture a sheet. The obtained sheet was put in the gear oven at 190° C. and 200° C. to measure the blackening time (minute) as <a thermal stability test>. The results are shown in Tables from 1 to 3.

The sheets 0.6mm thick obtained as mentioned above were glued together and a press processing was carried out at 190° C. for 5 minutes to prepare 1mm thick sheets. <The coloring resistant property test> and <the transparency test> were carried out using the obtained sheets according to the following methods. In addition, with respect to comparative examples wherein the component (C) is not used, the comparative test was carried out in the same manner as above. The results of examples are shown in Tables from 1 to 3 and the results of comparative examples are shown in Table 1 respectively.

<Transparency Test>

With respect to the 1 mm thick sheets obtained by performing a press processing at 190° C. for 5 minutes, the Haze value was measured by using the Haze guard 2 (manufactured by Toyo Seiki Seisaku-sho Co., LTD.).

<Coloring Resistant Property Test>

With respect to the 1 mm thick sheets obtained by performing a press processing at 190° C. for 5 minutes, the yellowness level (Y.I.) was measured by using the Color Ace TC-8600A (a general-purpose model colorimeter manufactured by Tokyo Denshoku Co., LTD.).

TABLE 1

|  |  | Examples |  |  |  |  | Comparative examples |  |  |
|---|---|---|---|---|---|---|---|---|---|
|  |  | 1 | 2 | 3 | 4 | 5 | 1 | 2 | 3 |
| Vinyl chloride resin*[1] |  | 100 | 100 | 100 | 100 | 100 | 100 | 100 | 100 |
| Component (A) | Zinc laurate | 0.3 | 0.3 | 0.3 | 0.3 | 0.3 | 0.3 |  |  |
|  | Zinc stearate |  |  |  |  |  |  | 0.4 |  |
|  | Zinc benzoate |  |  |  |  |  |  |  | 0.14 |
|  | zinc p-toluate |  |  |  |  |  |  |  | 0.14 |
|  | Zinc oleate |  |  |  |  |  |  |  | 0.2 |
| Component (B): Alkamizer P-93*[2] |  | 2.7 | 2.7 | 2.7 | 2.7 | 2.7 | 2.7 | 2.7 | 2.7 |
| Component (C): Diphenyl (2-ethylhexyl) phosphite |  | 0.2 | 0.4 | 0.6 | 0.8 | 1.2 |  |  |  |
| Lubricant*[3] |  | 1.0 | 1.0 | 1.0 | 1.0 | 1.0 | 1.0 | 1.0 | 1.0 |

TABLE 1-continued

|  |  | Examples | | | | | Comparative examples | | |
| --- | --- | --- | --- | --- | --- | --- | --- | --- | --- |
|  |  | 1 | 2 | 3 | 4 | 5 | 1 | 2 | 3 |
| Processing aid*4 |  | 1.0 | 1.0 | 1.0 | 1.0 | 1.0 | 1.0 | 1.0 | 1.0 |
| β-diketone compound*5 |  | 0.5 | 0.5 | 0.5 | 0.5 | 0.5 | 0.5 | 0.5 | 0.5 |
| Phenolic antioxidant*6 |  | 0.1 | 0.1 | 0.1 | 0.1 | 0.1 | 0.1 | 0.1 | 0.1 |
| Thermal stability | 190° C. | 180 | 180 | 180< | 180< | 180< | 165 | 165 | 140 |
| (Blackening time: minute) | 200° C. | 105 | 105 | 120 | 120 | 120 | 90 | 90 | 75 |
| Transparency Haze value (%) |  | 4.34 | 3.72 | 3.56 | 3.45 | 3.41 | 5.89 | 6.88 | 4.83 |
| Coloring properties (Y.I.) |  | 13.7 | 12.3 | 12.2 | 12.1 | 11.8 | 18.3 | 18.1 | 14.6 |

(Parts by mass)
*1ZEST 1000Z (manufactured by Shin Dai-Ichi Vinyl Corporation)
*2zinc-modified hydrotalcite: $Mg_{3.0}ZnAl_2(OH)_{12}(CO_3) \cdot 3H_2O$ (manufactured by Kyowa Chemical Industry Co., Ltd.)
(According to the expression of Claim 4, this is converted to $Mg_{3/6}Zn_{1/6}Al_{2/6}(OH)_2(CO_3)_{1/6} \cdot 0.5H_2O$.)
*3G-60 (phthalic acid alkyl ester lubricant)(manufactured by Cognis Oleo Chemicals Japan Ltd.)
*4P-551A (acrylic acid processing aid)(manufactured by Mitsubishi Rayon Co. Ltd.)
*5stearyl benzoylmethane
*6Tetrakis [methylene-3-(3',5'-di-tert-butyl-4'-hydroxyphenyl) propionate] methane

TABLE 2

|  |  | Examples | | | | | | | |
| --- | --- | --- | --- | --- | --- | --- | --- | --- | --- |
|  |  | 6 | 7 | 8 | 9 | 10 | 11 | 12 | 13 |
| Vinyl chloride resin*1 |  | 100 | 100 | 100 | 100 | 100 | 100 | 100 | 100 |
| Component (A) | Zinc laurate | 0.45 | 0.45 |  |  |  |  |  |  |
|  | Zinc stearate |  |  | 0.3 | 0.4 |  |  |  |  |
|  | Zinc benzoate |  |  |  |  | 0.14 | 0.14 | 0.14 | 0.2 |
|  | zinc p-toluate |  |  |  |  | 0.14 | 0.14 | 0.14 | 0.2 |
|  | Zinc oleate |  |  |  |  | 0.2 | 0.2 | 0.2 | 0.32 |
| Component (B): Alkamizer P-93*2 |  | 2.7 | 2.7 | 2.7 | 2.7 | 2.7 | 2.7 | 2.7 | 2.7 |
| Component (C): Diphenyl (2-ethylhexyl) phosphite |  | 0.6 | 1.2 | 0.8 | 1.2 | 0.4 | 0.6 | 1.2 | 1.2 |
| Lubricant*3 |  | 1.0 | 1.0 | 1.0 | 1.0 | 1.0 | 1.0 | 1.0 | 1.0 |
| Processing aid*4 |  |  |  |  |  |  |  |  |  |
| β-diketone compound*5 |  |  |  |  |  |  |  |  |  |
| Phenolic antioxidant*6 |  |  |  |  |  |  |  |  |  |
| Thermal stability | 190° C. | 180 | 180< | 180< | 180< | 165 | 165 | 165 | 165 |
| (Blackening time: minute) | 200° C. | 120 | 120 | 120 | 120 | 90 | 105 | 105 | 90 |
| Transparency Haze value (%) |  | 3.35 | 3.18 | 4.31 | 4.11 | 3.81 | 3.59 | 3.48 | 3.44 |
| Coloring properties (Y.I.) |  | 14.2 | 12.2 | 14.9 | 13.8 | 11.8 | 10.9 | 11.2 | 10.5 |

(Parts by mass)
*1ZEST 1000Z (manufactured by Shin Dai-Ichi Vinyl Corporation)
*2zinc-modified hydrotalcite: $Mg_{3.0}ZnAl_2(OH)_{12}(CO_3) \cdot 3H_2O$ (manufactured by Kyowa Chemical Industry Co., Ltd.)
(According to the expression of Claim 4, this is converted to $Mg_{3/6}Zn_{1/6}Al_{2/6}(OH)_2(CO_3)_{1/6} \cdot 0.5H_2O$.)
*3G-60 (phthalic acid alkyl ester lubricant)(manufactured by Cognis Oleo Chemicals Japan Ltd.)
*4P-551A (acrylic acid processing aid)(manufactured by Mitsubishi Rayon Co. Ltd.)
*5stearyl benzoylmethane
*6tetrakis [methylene-3-(3',5'-di-tert-butyl-4'-hydroxyphenyl) propionate] methane

TABLE 3

|  |  | Examples | | | | | | | |
| --- | --- | --- | --- | --- | --- | --- | --- | --- | --- |
|  |  | 14 | 15 | 16 | 17 | 18 | 19 | 20 | 21 |
| Vinyl chloride resin*1 |  | 100 | 100 | 100 | 100 | 100 | 100 | 100 | 100 |
| Component (A): zinc laurate |  | 0.3 | 0.3 | 0.3 | 0.3 | 0.3 | 0.3 | 0.3 | 0.3 |
| Component (B): Alkamizer P-93*2 |  | 2.7 | 2.7 | 2.7 | 2.7 | 2.7 | 2.7 | 2.7 | 2.7 |
| Component (C) | Triphenyl phosphite | 0.4 | 0.8 |  |  |  |  |  |  |
|  | Diphenyl(C12 to 15 mixed alkyl)phosphite |  |  | 0.4 | 0.8 |  |  |  |  |
|  | Phenyl bis(iso tridecyl) phosphite |  |  |  |  | 0.4 | 0.8 |  |  |
|  | Tris(decyl) phosphite |  |  |  |  |  |  | 0.4 | 0.8 |
| Lubricant*3 |  | 1.0 | 1.0 | 1.0 | 1.0 | 1.0 | 1.0 | 1.0 | 1.0 |
| Processing aid*4 |  | 1.0 | 1.0 | 1.0 | 1.0 | 1.0 | 1.0 | 1.0 | 1.0 |
| β-diketone compound*5 |  | 0.5 | 0.5 | 0.5 | 0.5 | 0.5 | 0.5 | 0.5 | 0.5 |
| Phenolic antioxidant*6 |  | 0.1 | 0.1 | 0.1 | 0.1 | 0.1 | 0.1 | 0.1 | 0.1 |
| Thermal stability | 190° C. | 180 | 180< | 180 | 180< | 180 | 180< | 180 | 180< |
| (Blackening time: minute) | 200° C. | 105 | 120 | 105 | 120 | 105 | 120 | 105 | 120 |

TABLE 3-continued

| | Examples | | | | | | |
|---|---|---|---|---|---|---|---|
| | 14 | 15 | 16 | 17 | 18 | 19 | 20 | 21 |
| Transparency Haze value (%) | 3.71 | 3.55 | 3.75 | 3.50 | 4.38 | 4.52 | 4.54 | 4.56 |
| Coloring properties (Y.I.) | 13.4 | 13.1 | 12.8 | 12.3 | 13.7 | 13.2 | 14.1 | 14.7 |

(Parts by mass)
*[1]ZEST 1000Z (manufactured by Shin Dai-Ichi Vinyl Corporation)
*[2]zinc-modified hydrotalcite: $Mg_{3.0}ZnAl_2(OH)_{12}(CO_3) \cdot 3H_2O$ (manufactured by Kyowa Chemical Industry Co., Ltd.)
(According to the expression of Claim 4, this is converted to $Mg_{3/6}Zn_{1/6}Al_{2/6}(OH)_2(CO_3)_{1/6} \cdot 0.5H_2O$.)
*[3]G-60 (phthalic acid alkyl ester lubricant)(manufactured by Cognis Oleo Chemicals Japan Ltd.)
*[4]P-551A (acrylic acid processing aid)(manufactured by Mitsubishi Rayon Co. Ltd.)
*[5]stearyl benzoylmethane
*[6]Tetrakis [methylene-3-(3',5'-di-tert-butyl-4'-hydroxyphenyl) propionate] methane From the results of Tables 1, 2 and 3, it was confirmed that the resin composition of the present invention is excellent in transparency, thermal stability and coloring resistant properties.

INDUSTRIAL APPLICABILITY

The vinyl chloride resin composition of the present invention, which is excellent in transparency, thermal stability and coloring resistant properties, is suitably used for transparent hard resin and transparent semi-hard resin in particular. It can be used for containers requiring glass-like transparency, and also it can be applied to industrial boards, decorative boards, trays, film, shrink film, sheets, building materials, pipes for water supply and drainage, plates, joints, materials for automobile, hoses, IC cases and bottles or the like. Therefore, it is extremely significant for industries.

The invention claimed is:

1. A vinyl chloride resin composition for transparent products, comprising 100 parts by mass of the vinyl chloride resin, 0.01 to 10 parts by mass of the following component (A), 0.01 to 10 parts by mass of the following component (B) and 0.01 to 3 parts by mass of the following component (C);
   (A) At least one kind of salt selected from among organic acid zinc salts,
   (B) At least one kind of compound selected from among zinc-modified hydrotalcite compounds,
   (C) At least one kind of compound selected from among phosphite ester compounds.

2. The vinyl chloride resin composition for transparent products according to claim 1, wherein said component (C) is a phosphite ester compound having 12 to 32 carbon atoms.

3. The vinyl chloride resin composition for transparent products according to claim 1, wherein said component (A) is a zinc salt of organic carboxylic acid having 6 to 18 carbon atoms.

4. The vinyl chloride resin composition for transparent products according to claim 1, wherein said component (B) is a zinc-modified hydrotalcite compound represented by the following general formula (1);

$$M_{y1}Zn_{y2}Al_x(OH)_2(CO_3)_{x/2} \cdot mH_2O \quad (1)$$

wherein M represents magnesium, or magnesium and calcium, x, y1 and y2 are numbers satisfying the conditions represented by the following formulae respectively, m represents 0 or any positive numbers; $0 < x \leq 0.5$, $y1+y2=1-x$, $y1 \geq y2$, $0.3 y1 < 1$ and $0 < y2 < 0.5$.

5. The vinyl chloride resin composition for transparent products according to claim 1, wherein said composition does not contain an organic tin compound.

6. A transparent molded article obtained by molding the vinyl chloride resin composition for transparent products according to claim 1.

* * * * *